12) United States Patent
Everett et al.

(10) Patent No.: US 8,970,111 B2
(45) Date of Patent: Mar. 3, 2015

(54) METHOD AND APPARATUS FOR AUTOMATICALLY CONTROLLING AIRBORNE VEHICLE LIGHTING SYSTEMS

(75) Inventors: Michael Louis Everett, El Paso, TX (US); Mario Ruiz, Jr., El Paso, TX (US); Louis Jackson Everett, El Paso, TX (US)

(73) Assignee: Evolved Aircraft Systems, L.L.C., El Paso, TX (US)

( * ) Notice: Subject to any disclaimer, the term of this patent is extended or adjusted under 35 U.S.C. 154(b) by 402 days.

(21) Appl. No.: 13/036,134

(22) Filed: Feb. 28, 2011

(65) Prior Publication Data

US 2012/0133283 A1 May 31, 2012

Related U.S. Application Data

(60) Provisional application No. 61/309,857, filed on Mar. 2, 2010.

(51) Int. Cl.
*B60Q 1/14* (2006.01)
*H05B 37/02* (2006.01)

(52) U.S. Cl.
CPC ................................ *H05B 37/0227* (2013.01)
USPC ............................................. 315/77; 315/82

(58) Field of Classification Search
USPC ............... 315/77, 80, 82; 340/935, 936, 939; 307/10.1, 10.8
See application file for complete search history.

(56) References Cited

U.S. PATENT DOCUMENTS

| 4,899,083 | A | 2/1990 | Kataoka et al. | |
|---|---|---|---|---|
| 5,815,073 | A | 9/1998 | Gomez et al. | |
| 6,080,063 | A | * 6/2000 | Khosla | 463/42 |
| 6,252,525 | B1 | 6/2001 | Philiben | |
| 6,906,467 | B2 * | 6/2005 | Stam et al. | 315/82 |
| 7,055,944 | B2 | 6/2006 | Konishi | |
| 7,081,835 | B2 | 7/2006 | Fleischmann et al. | |
| 7,639,149 | B2 | 12/2009 | Katoh | |
| 7,659,670 | B2 * | 2/2010 | Asada | 315/82 |
| 7,843,353 | B2 | 11/2010 | Pan et al. | |
| 7,872,345 | B2 | 1/2011 | Chow et al. | |
| 8,358,074 | B2 * | 1/2013 | Biondo et al. | 315/82 |
| 2003/0107323 | A1 * | 6/2003 | Stam | 315/82 |
| 2005/0104740 | A1 | 5/2005 | Stokes et al. | |
| 2006/0002110 | A1 * | 1/2006 | Dowling et al. | 362/252 |
| 2009/0010494 | A1 * | 1/2009 | Bechtel et al. | 382/104 |
| 2009/0153347 | A1 | 6/2009 | Romig et al. | |
| 2009/0225559 | A1 * | 9/2009 | Cheng et al. | 362/466 |
| 2010/0213847 | A1 | 8/2010 | Biondo et al. | |
| 2010/0321496 | A1 | 12/2010 | Ulbricht | |

* cited by examiner

*Primary Examiner* — Tung X Le
(74) *Attorney, Agent, or Firm* — Kermit D. Lopez; Luis M. Ortiz; Ortiz & Lopez, PLLC (57) ABSTRACT

An airborne vehicle lighting control apparatus and method for automatically controlling activation and deactivation of an airborne vehicle lighting system. A processor for automatically controlling the lighting system can be employed and having one or more sensors operatively connected to the processor for sensing the current flight operating mode and geographical position of an airborne vehicle. The processor can activate or deactivate lighting based on the current flight operating mode and position.

18 Claims, 7 Drawing Sheets

METHOD AND APPARATUS FOR AUTOMATICALLY CONTROLLING AIRBORNE VEHICLE LIGHTING SYSTEMS

CROSS-REFERENCE TO PROVISIONAL APPLICATION

This patent application claims priority under 35 U.S.C. §119(e) to provisional patent application Ser. No. 61/309,857 entitled "Method or Apparatus for Automatically Controlling Aircraft Lighting Systems", which was filed on Mar. 2, 2010, the disclosure of which is incorporated herein by reference in its entirety.

TECHNICAL FIELD

Embodiments are generally related to airborne vehicle lighting systems. Embodiments are also related to the field of automatically controlling airborne vehicle lighting systems.

BACKGROUND OF THE INVENTION

Many processes and devices have been used for aircraft lighting. Aircraft navigation lights are placed in a manner similar to that of marine vessels, with a red navigation light located on the left wingtip leading edge and a green light on the right wingtip leading edge. A white navigation light is as far aft as possible on the tail or on each wing tip. High-intensity strobe lights may be located on the aircraft to aid in collision avoidance as rotating beacons.

Navigation or position lights in civil aviation are required to be turned on from sunset to sunrise in accordance with Federal Aviation Regulations. High-intensity white strobe lights are part of the anti-collision light system, as well as the aviation red or white rotating beacon. The anti-collision light system (either strobe lights or rotating beacons) is required for all aircraft built after Mar. 11, 1996 for all flight activities in poor visibility, and recommended in good visibility.

An example illustrative of when a rotating beacon would be used is immediately before engine start. The rotating beacon would be activated to notify personnel in the vicinity of the aircraft that the engines are about to be started. These beacon lights should be on for the duration of the flight. While taxiing, the taxi lights are activated during times of darkness to light the taxiway and assist the pilot in taxing the aircraft. When coming onto the runway, the taxi lights may be deactivated or left on and the landing lights and strobes are activated for maximum visibility during takeoff.

Pilots will typically utilize landing lights and strobe lights, if installed, in the vicinity of an airport during both day and night operations to increase visibility to other aircraft and air traffic control facilities. When the landing lights are no longer required, they can be turned off at the pilot's discretion during the climb or cruise phase of flight as the aircraft departs the higher congestion of the airport traffic area. The cycle works the same when approaching an airport for landing, but in reverse order.

Aircraft interior lights work similarly to automobile lighting. There may be dome, courtesy lighting or baggage compartment lighting installed. Instrument panel lighting must be installed and utilized on all aircraft certified for night operations, but may be required during periods of daylight depending upon the ambient lighting.

Different external and internal lights may be desired as aircraft exit an airport traffic area and transits other airspace classification areas or also as sunset or sunrise approaches and ambient lighting conditions change. A system and method is needed to automatically control all aspects of required lighting on an airborne vehicle in order to reduce pilot distractions and workload.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for an improved airborne vehicle lighting system.

It is another aspect of the disclosed embodiments to provide for an automatic airborne vehicle lighting system.

The aforementioned aspects and other objectives and advantages can now be achieved as described herein. An airborne vehicle lighting control apparatus is disclosed for automatically controlling an airborne vehicle lighting system. A processor for automatically controlling the lighting system can be employed and have one or more sensors operatively connected to the processor for sensing an operating mode of an airborne vehicle. The processor can activate or deactivate lighting based on the current operating mode.

The disclosed embodiments relates to a method and apparatus for automatically controlling aircraft lighting systems such as, but not limited to, Aircraft Navigation Lights, Aircraft Position Lights, Aircraft Strobe Lights, Aircraft Taxi Lights, Aircraft Landing Lights, Aircraft Interior Lights, Aircraft Courtesy Lights, or any other illuminating device mounted onboard an airborne vehicle or any vehicle capable of flight, regardless of whether or not that aircraft is powered, unpowered, rotary wing, fixed wing, heavier than air, lighter than air, or any other flight capable vehicle, regardless of whether or not the vehicle carries passengers. The apparatus described herein comprises a processor which is capable of making a determination of ambient light levels, as well as the current time of day. Such capability enables the processor to identify when certain aircraft lights should be activate. This capability is enhanced by the integration of Global Positioning System technology (GPS), as well as engine tachometer, or engine speed sensing devices, voltmeter, or other voltage measuring devices, and pilot-static or pressure sensory devices to make determination as to the optimal light settings. Other sensory devices may be incorporated in addition to or in exchange of proposed components to serve the same or similar purpose.

Utilizing the sensor devices, the processor is capable of identifying whether an aircraft is on the ground or in flight, the aircraft position, the direction and velocity of the aircraft, as well as how much ambient light is available. Further integration of geographical data including airport location and elevation, as well as terrain or ground elevation provides information regarding the vehicles height above ground at any desirable time. The processor is then capable of operating all external and internal lights on the aircraft based on the current mode and status of the aircraft without any pilot input.

The processing device is capable of activating or deactivating aircraft lights as desired based on the current operating mode of the airborne vehicle. The current operating mode of the airborne vehicle as determined by the processor includes, but is not limited to, ground operations, flight operations, daylight operations, night operations, operations within certain three-dimensional geographical airspace regions based on position, altitude and/or heading, or any combination of the above operating conditions.

The configuration of which state to activate or deactivate these lights are reconfigurable based upon pilot, operator, or manufacturer settings. When a vehicle master battery switch is activated, the processor will automatically activate the aircraft rotating beacon so long as battery voltage is measured to be above a predetermined point to be chosen based upon the aircraft model and type to ensure sufficient battery power for engine start. After the engine or propulsion system, or other system capable of recharging the onboard battery has been activated, the processing system will make determination as to an expected amount of ambient light based on GPS determined position, time of day, and the position of the sun in the sky. If this expected ambient light value is measured to be below a predefined point, the processor will activate position or navigational lights. In addition to expected ambient light levels, the processor will also make a determination as to the aircraft current state of flight. If determined to be on the ground, the processor will also activate vehicle landing and/or taxi light systems as appropriate.

Upon takeoff, the processor will deactivate vehicle landing and/or taxi light systems once the aircraft has climbed above a predetermined altitude above the departure airport or flown a predetermined distance away from the departure airport. The processor also possesses the capability to activate and deactivate vehicle strobe lights when in the air or on the ground respectively. The processor monitors aircraft position so that when an aircraft penetrates a predefined boundary established around the perimeter of an airport or terrain, vehicle landing and taxi light systems will be activated where available for anti-collision as well as recognition purposes. These boundaries will vary based upon the size and location of the airport.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
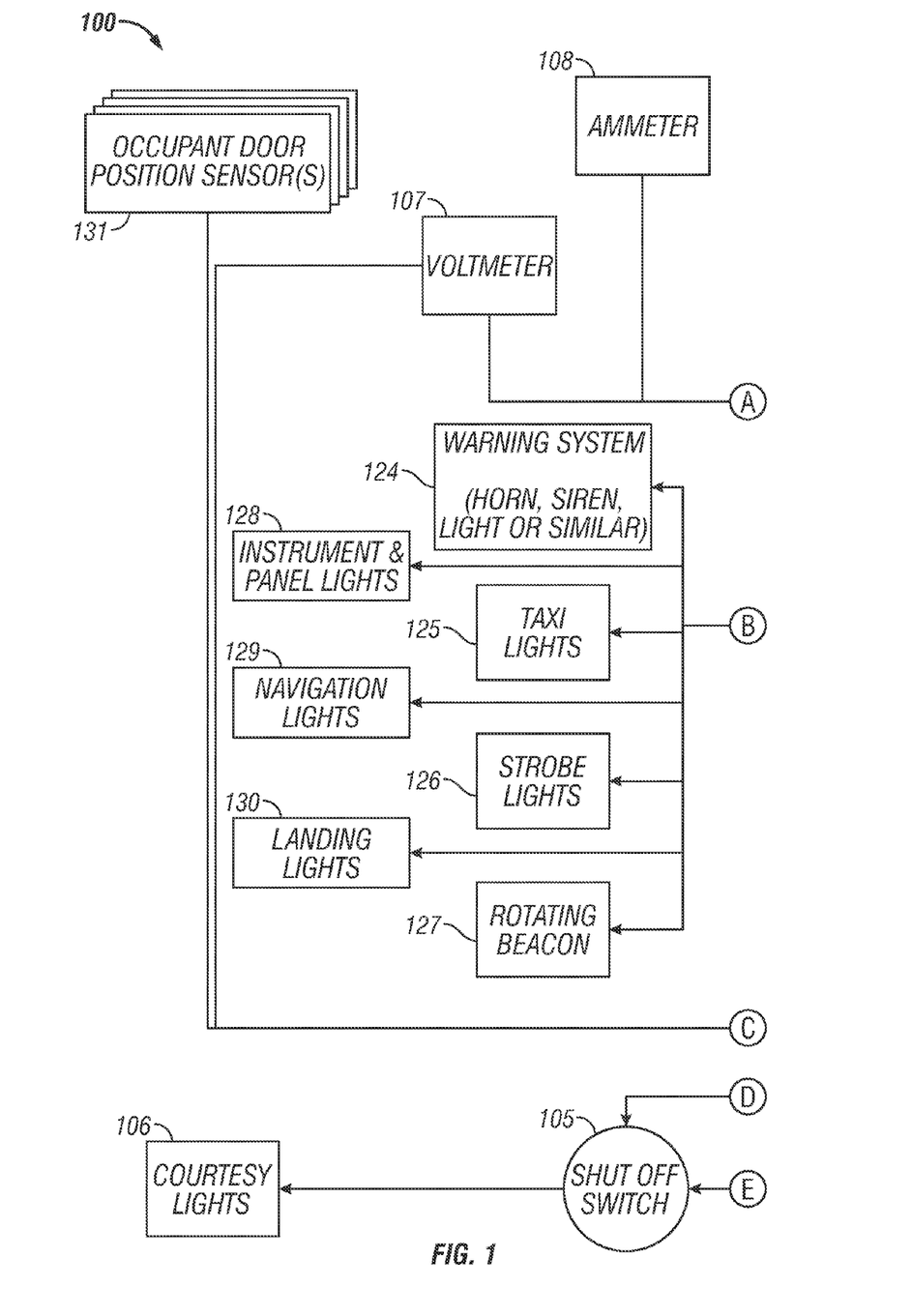
FIG. 1 illustrates a block diagram of an airborne vehicle automatic lighting control system, which can be implemented in accordance with a preferred embodiment.

FIG. 1 illustrates a block diagram of an airborne vehicle automatic lighting control system 100. The airborne vehicle automatic control system includes a primary processor 101 which receives inputs from various sensors and includes the capability of identifying when specific vehicle lights should be activated based on the current operating state of the vehicle. The configuration of which state to activate or deactivate these lights is reconfigurable based upon pilot, operator, manufacturer, or other parties requirements. Primary processor 101 includes the main program 102 for operating the automatic vehicle lighting system. Main program 102 includes all clocks and algorithms for system operation. Primary processor 101 includes a memory which further includes a database to provide geographical information to the primary processor 101.

Primary processor 101 receives input and data from various sensors located throughout the airborne vehicle and sends activation and deactivation signals to all system lighting. The various sensors may include a battery voltmeter 107, an ammeter 108, a vehicle altimeter 109, a vehicle airspeed sensor 110, a Global Positioning System (GPS) receiver and processor 111, an airport and airspace database 122, and a geographical terrain database 123. Primary processor 101 further receives input from specific light switches such as landing and taxi light selector switch 113 and rotating beacon selector switch 114. Sensors 115 are provided in order for the primary processor 101 to determine if the engine is running. These sensors may include an engine tachometer 116 and exhaust gas temperature probes 117, 118. Further, input sensors to primary processor 101 include sensors 119 to determine if ambient conditions are light or dark. These are ambient light sensors 120 and 121.

Primary processor 101 transmits activation and deactivation signals to various external and internal lights as required. These external lighting systems may include, but are not restricted to, a warning system 124, which may include a horn, siren or light, taxi lights 125, strobe lights 126, rotating beacon 127, instrument panel lights 128, navigation or position lights 129, and landing lights 130. Primary processor 101 may also send activation signals to shut off switch 105 and courtesy lights 106.

The automatic lighting control system 100 further may include a courtesy light processor 103 which could include a courtesy light main program 104 comprising all clocks and algorithms for controlling the airborne vehicle courtesy lights. The courtesy light processor 103 receives input from occupant door position sensors 131.

The configuration of which state to activate or deactivate the airborne vehicle lights is reconfigurable based upon pilot, operator, manufacturer, or other parties requirements. The invention described herein will be initially developed to function as follows, but activation triggers are flexible in process. When the airborne vehicle master battery switch is activated, the primary processor 101 will automatically measure the battery voltage by voltmeter 107. If the battery voltage is above a predetermined voltage to be chosen based upon the aircraft model and type, the primary processor sends a signal to activate the aircraft rotating beacon 127.

Figure 2:
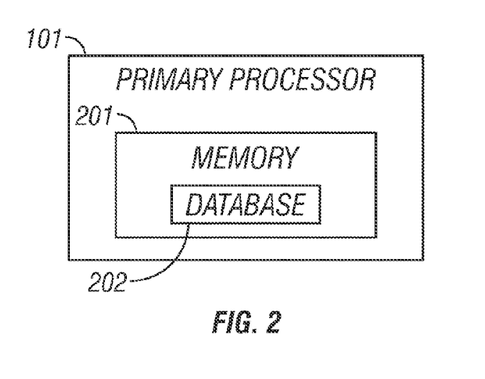
FIG. 2 illustrates a processor and memory, which can be implemented in accordance with a preferred embodiment.

A Global Positioning System (GPS) 111 is utilized to provide the primary processor 101 information regarding vehicle location and airspeed sensor 110 is utilized to measure vehicle airspeed through a pitot tube. The GPS 111 is utilized to determine where an aircraft is physically positioned in three-axes: latitude, longitude, and altitude, therein providing position and altitude to primary processor 101. This information is backed up by altimeter sensor 109 capability for redundancy. GPS 111 position data is also utilized to determine expected ambient light conditions based on calculated position, time of day, and the position of the sun in the sky. In addition to main program 102, utilized for system function, primary processor 101 includes a memory 201 which further comprises a geographical database 202, as illustrated in FIG. 2.

After the engine or propulsion system, or other system capable of recharging the onboard battery has been activated, the primary processor 101 will make a determination as to the amount of expected ambient light based on GPS 111 data. Alternatively or in a back-up mode, ambient light may be sensed by ambient light sensors 120 and 121. If this ambient light value is measured or expected to be below a predefined point, the primary processor 101 will activate vehicle navigational lights 129, also referred herein as recognition or position lights. In addition to ambient light levels, the primary processor 101 will also make a determination as to the airborne vehicle current state or mode of flight, if determined to be on the ground, the primary processor 101 will also activate vehicle landing 130 and/or taxi light system 125 as appropriate.

Upon takeoff, or transition from ground to flight, the primary processor 101 is capable of deactivating vehicle landing 130 or taxi light 125 systems as soon as the airborne vehicle has climbed above a predetermined altitude or departed a predetermined distance from the airport in which it has taken off from. The system also possesses the capability to activate and deactivate the airborne vehicle strobe lights 126 when in the air or on the ground, respectively. When the airborne vehicle penetrates a predefined boundary established around the perimeter of an airport, or a predefined proximity to terrain, vehicle landing 130 and taxi light 125 systems could be activated where available for anti-collision as well as recognition purposes. These boundaries will vary based upon the size and location of an airport.

Geographical database 202 is provided for geographical information to the primary processor 101. This geographical database 202 may be developed in a sparse or simple nature, a highly detailed complex structure, or may be eliminated all together when its benefits are not desired. The geographical database 202 classifies airports or geographical regions as separate types, for example, B, C, D, S, P, and type O. The geographical database 202 maintains coordinates of geographical regions in three-dimensions as well as coordinates of known airports. Each airport to be included in the geographical database 202 will be fitted into one of these categories based upon its size, location, amount of air traffic, and its traffic control system as well as other factors as required. These geographical regions in the geographical database 202 are utilized as lighting activation and deactivation boundaries, depending upon whether the airborne vehicle is entering or exiting a specific geographical region.

Figure 6:
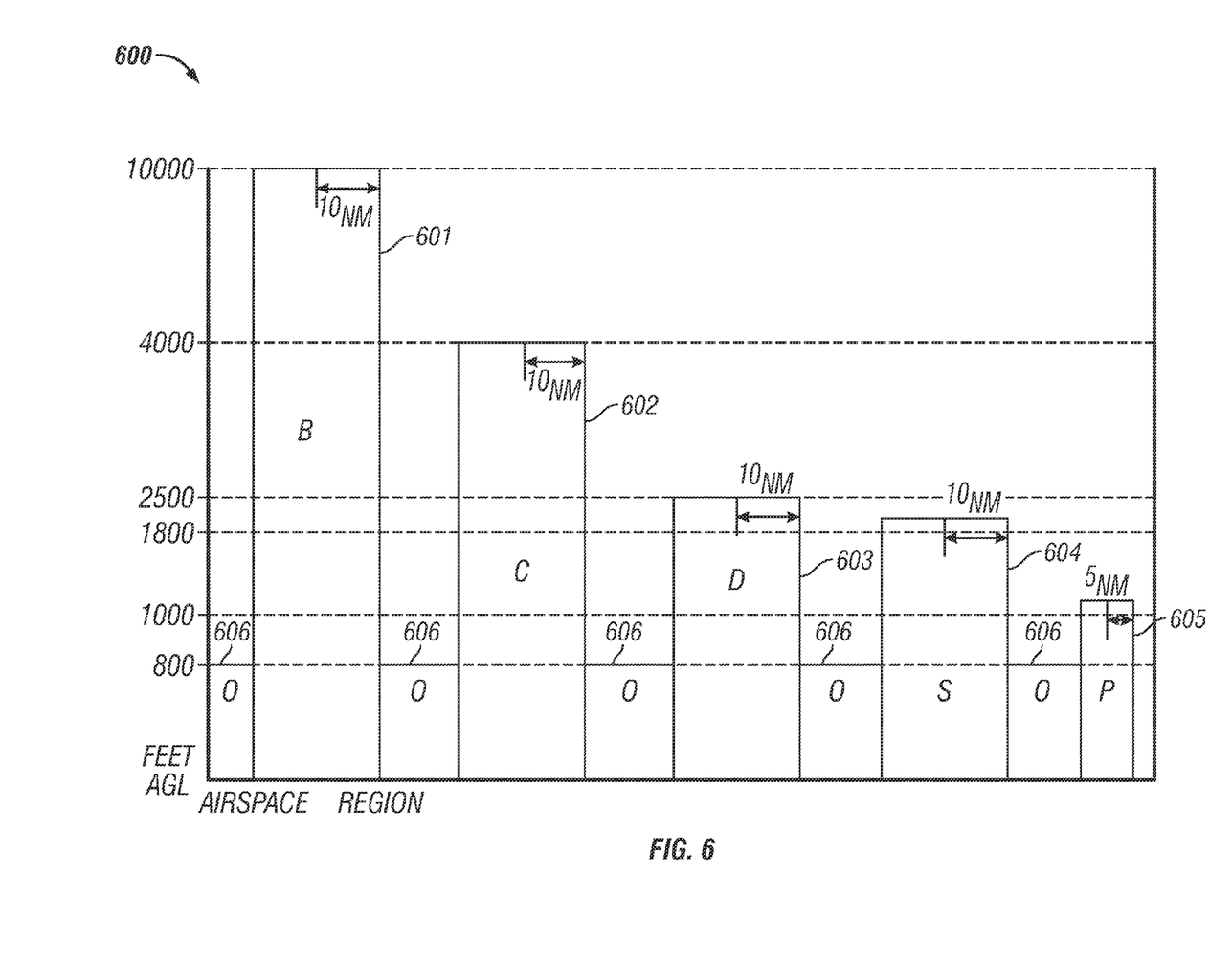
FIG. 6 illustrates a cross-sectional vertical diagram of airspace regions contained within a geographical database, in accordance with a preferred embodiment.

A non-limiting example for utilization of the airspace identified regions in the geographical database 202 is implemented herein. FIG. 6 illustrates a cross-sectional vertical diagram 600 of airspace regions contained within geographical database 202, in accordance with a preferred embodiment. Geographical regions are three-dimensional geographical airspaces and may be classified, for example, by types B, C, D, and S or any other labeling name or classification. FIG. 6 illustrates an example of a type B airspace region 601 centered on an airport. Type B airspace region 601 may have an activation/deactivation radius of 10 nautical miles measured from the airport center, based on airport size or traffic. Airspace regions classified as type B may have an activation/deactivation ceiling of ten thousand feet as measured above ground level (AGL) at the center of the airport. Airspace region 602, classified as type C, may have an activation/deactivation ceiling of four thousand feet AGL as measured at the center of the airport.

Airspace region 603 classified as type D may have an activation/deactivation ceiling of two thousand five hundred feet AGL from the center of the airport, and airspace region 604 classified as type S may have an activation/deactivation ceiling of one thousand eight hundred feet AGL as measured at the center of the airport. Airspace region 605 classified as type P may possess an activation/deactivation radius of five nautical miles and an activation/deactivation ceiling of one thousand feet AGL as measured from the center of the airport. Airspace region 606 type O may not be provided a radius, but may possess an activation/deactivation ceiling of eight hundred feet AGL as measured at the point of type O class and would correspond to regions not associated with an airport within the geographical database 202. Airspace region types, B, C, D, S, and P may correspond to actual airports registered with the FAA, while locations classified as type O may correspond to any specific location or landmark chosen by system developers or operators, and may consist of all other areas not otherwise identified as airports.

Figure 7:
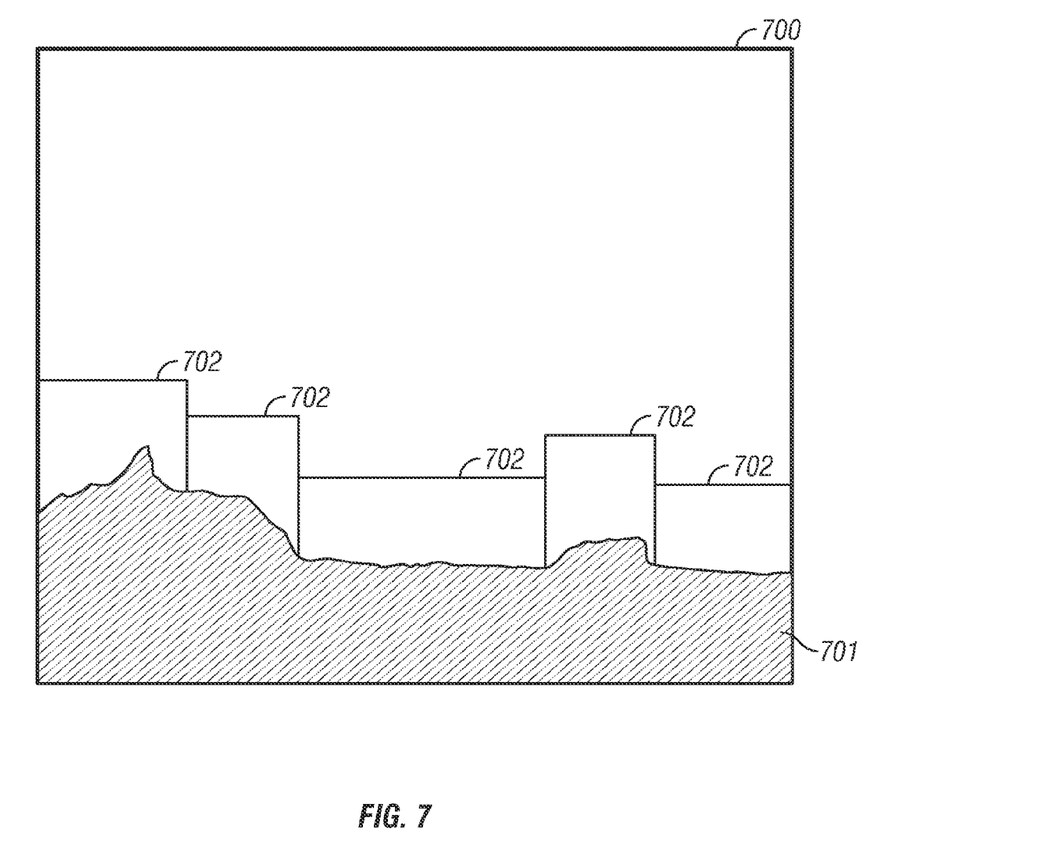
FIG. 7 illustrates a cross-sectional vertical diagram of airspace regions contained within a geographical database, in accordance with an alternate embodiment.

FIG. 7 illustrates a cross-sectional vertical diagram 700 of airspace regions contained within geographical database 202, in accordance with an alternate embodiment. The geographical database 202 is developed in a grid layout. FIG. 7 illustrates fluctuating or varying terrain 701. Above the terrain 701 are individual grid sections 702 identified in geographical database 202. Each grid section 702 possesses a classified airspace region type O region located centrally from surface to eight hundred feet AGL. The size of each grid section 702 will vary based upon the fluctuation of terrain elevation within the grid 702, thus regions in which a large fluctuation of terrain elevation exist may be of a smaller geographical area than regions of relatively flat terrain. Thus grid sections 702 may be made as small as possible to ensure minimal elevation variance. An estimate for terrain elevation will be derived through linear interpolation of type O elevations within each grid 702 as well as airport elevations between grids. Classified airport regions will be included in addition to this grid system in actual geographical locations and their elevations included in the interpolations.

Utilizing the geographical database 202 as well as GPS 111 and other sensory devices, the primary processor 101 is capable of keeping real time track of the airborne vehicle position on the globe within the measurable accuracy of the sensors, including altitude above ground level (since the terrain elevation is known). Anytime the aircraft penetrates type O airspace (within eight hundred feet of the ground) at night but remains airborne, all lights are activated including landing lights 130 and taxi lights 125. This is to provide visual recognition as well as safety in the event of emergency landing away from an airport. When above this altitude and outside type O airspace (and outside airport airspace as determined by geographical database 202), landing 130 and taxi 125 lights are deactivated (all lights except rotating beacon 127 during day time). In addition, anytime the vehicle penetrates any airport airspace, as specified in the geographical database 202, the landing lights 130 and taxi lights 125 can be activated for visual recognition by the tower as well as other aircraft.

All classified regions can be encapsulated by a region bounded by the radius and the ceiling forming a three-dimensional airspace region measured from ground level. GPS 111 data is monitored continuously at a speed permitted by primary processor 101 cycle times. If the airborne vehicle is identified on a heading or track to penetrate or to exist in a region encapsulated by one of these boundaries, all exterior vehicle lights including landing 130 and taxi light 125 systems may be activated where available for visual recognition purposes. This can be performed either day or night based upon operator demands. Outside these regions lighting systems may be deactivated, as desired by operator demands.

A device capable of varying electrical voltage levels based upon available light is utilized as ambient light sensors 120 and 121. Two ambient light sensors 120 and 121 are utilized primarily to determine if vehicle lights will serve a useful purpose. Ambient light sensors 120 and 121 are back-up up for the GPS 111 to determine if any specific vehicle light actuation is beneficial. Ambient light sensors 120 and 121 transmit input to both the primary processor 101 and courtesy light processor 103.

A three-position toggle switch can be utilized for each lighting system providing operator controllable settings for lights on, lights off, and lights automatic. FIG. 1 illustrates three-position switches 113 and 114 for landing and taxi light control and rotating beacon control, respectively. Such capability provides a simple method for operator override thereby allowing operator independent control of each lighting system. A voltage measuring device in the form of voltmeter 107 is utilized to measure battery health of the airborne vehicle. A magnetic pickup or magnetic sensor can be utilized to measure engine RPM in the form of tachometer 116. Other engine operating sensors comprise exhaust gas temperature probes 117 and 118.

The airspeed information from airspeed sensor 110 can be utilized to make a determination as to whether a vehicle has sufficient speed for flight. GPS 111 and altimeter sensor 109 can be utilized to determine if the vehicle is in flight. Voltage measuring sensor 107 can be utilized to ensure that the vehicle battery is not unduly taxed by current drawing systems aiding in preventing insufficient power for starter motor activation. The tachometer 116 can be utilized to determine when an aircraft's engine is operational or preparing to taxi under its own power. Alternate components or methods may be utilized in addition to or in exchange of those described herein to serve similar purposes. Further, devices or components may be eliminated when the benefits of such item is undesirable. Additional components such as door position sensors 131 may be utilized or included to provide automatic activation of interior lights or courtesy lights 106.

How and when lights are activated and deactivated by automatic lighting control system 100 will be dependent upon owner or operator requirements. The geographical database 202 may be altered in any manner desired so long as encapsulated geographical regions exist where the lights will be activated and deactivated by primary processor 101. Equipment components, as well as installation locations and quantities may be altered where applicable to serve a similar function and will be specific airborne vehicle dependent, or may be eliminated when such benefit is unnecessary. The primary processor 101 may be modified utilizing timing and counting capability to increase performance and minimize the risk of rapid activation and deactivation of airborne vehicle lights when the vehicle is operating in regions in which the aircraft may frequently enter and exit a predefined geographical region. This may be done via multiple techniques. First, a primary timer may or may not be incorporated to ensure that the aircraft has been inside or outside a capsule long enough to activate, such as a 30 second delay timer incorporated within main program 102. Second, the primary processor 101 may monitor vehicle heading and trajectory to estimate how close the vehicle will come to a classified airport. This information is utilized by the primary processor 101 in an effort to only activate lighting systems when the aircraft will come within a predefined distance of an airport. The geographical database 202 may be modified in such a manner as to prevent rapid activation and deactivation of vehicle lights.

Strobe lights 126 are activated by one of two different configurations. The configuration to be used can be selected by the operator or end user. One configuration may be to activate the strobes anytime it is dark, as determined by ambient light sensors 120 and 121, and the engine is running. The second configuration may be to only activate the strobe lights 126 while the aircraft is at or above takeoff speed at night, as measured by airspeed sensor 110 and ambient light sensors 120 and 121, preventing the high intensity flash from distracting other pilots. Similarly rotating beacon 127 also may include two different configurations. The first configuration may be to always be on when the vehicle master battery switch is on and the battery is healthy, as determined by voltmeter 107. The second configuration may be to turn rotating beacon 127 off while it is in sufficient ambient light and the aircraft is in flight and also is not within one of the airspace regions requiring rotating beacon activation. At night, rotating beacon 127 is always on in flight.

An example of the operation of the automatic lighting system follows. If a pilot first arrives at the vehicle in the dark, the courtesy lights 106 will be activated by the courtesy light processor 103 based on input from the ambient light sensors 120 and 121. The courtesy lights will be activated for a predetermined time period as soon as the occupant door position sensor 131 sends a signal of door operation. The baggage compartment may also include a door position sensor 131 so that the baggage compartment lights will automatically activate during darkness. During the daylight, this will not happen due to light sensing from ambient light sensors 120 and 121.

When the vehicle master battery switch is activated, the primary processor 101 will receive the battery voltage from the voltmeter 107 and if the battery is sufficiently charged, the rotating beacon 127 will activate regardless of day or night. The courtesy lights 106 would still be on unless the predetermined time has elapsed. When the engine starts and the alternator is charging the battery, the courtesy lights 106 will dim out while the panel and instrument lights 128 dim, if in darkness. After engine start, the taxi lights 125 and/or the landing lights 130 will illuminate based upon operator preference, and the navigation lights 129 will illuminate.

As the vehicle accelerates to a predetermined speed such as rotation speed, the strobe lights 126 will activate ensuring the lights are on for takeoff and climb out of the airspace surrounding the airport. As soon as the aircraft leaves the airport geographical region boundary, the landing lights 130 and taxi lights 125 are deactivated. When the aircraft reenters the airport geographical region boundary, the taxi lights 125 and landing lights 130 are activated and illuminated. Upon landing, the strobe lights 126 will turn off as the vehicle decelerates based on GPS 111 input or airspeed sensor 110. Once the vehicle comes to a stop and the engine is shut off, the landing 130, taxi 125, navigation 129, and panel/instrument 128 lights will turn off. If in darkness as determined by input from ambient light sensors 120 and 121, the courtesy lights will activate for a predetermined time. When the master battery switch is turned off, the rotating beacon 127 will turn off.

Figure 3:
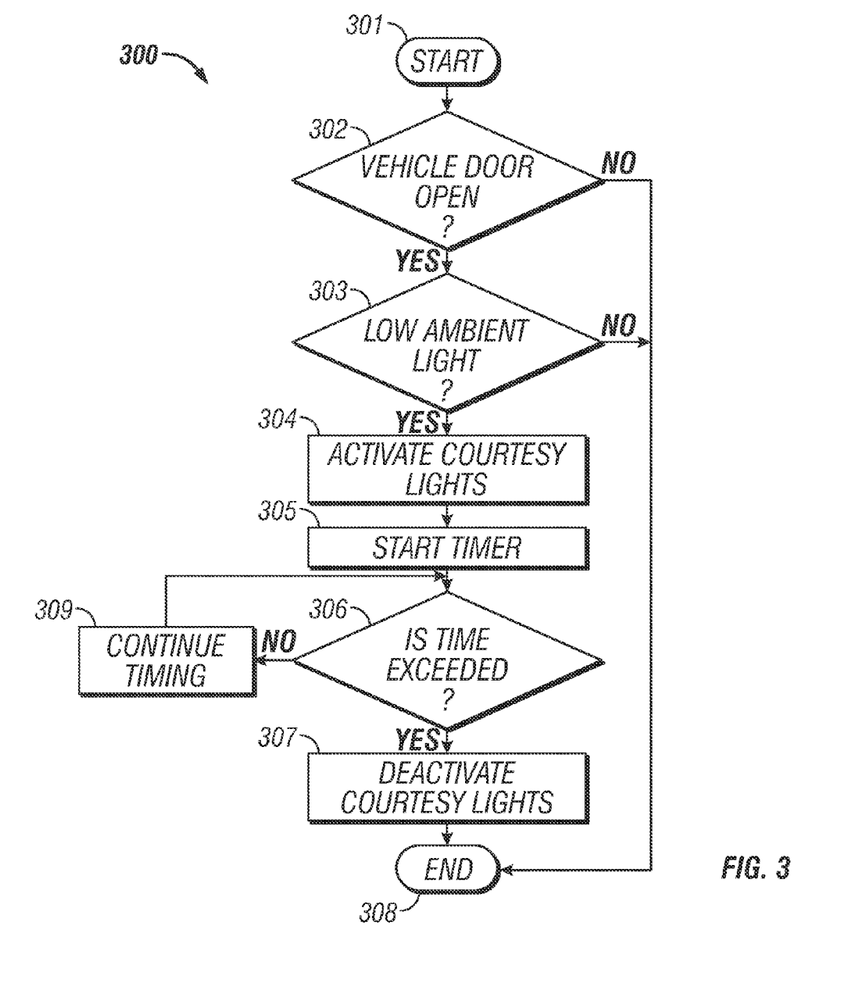
FIG. 3 illustrates a high level flow chart of logical operational steps of a method for automatically controlling airborne vehicle courtesy lights, in accordance with a preferred embodiment.

FIG. 3 illustrates a high level flow chart 300 of logical operational steps of a method for automatically controlling airborne vehicle courtesy lights. A courtesy light as defined herein is an illumination device that is activated with the opening of a door. Doors of an airborne vehicle which may activate courtesy lights in the present invention may include passenger and crew entry doors, baggage compartment doors, engine or electronic compartment doors or any other door or access panel associated with vehicle or compartment entry. The method starts at block 301. Block 302 illustrates the step wherein it is determined if a door is open. If a door is not open, then no action is taken, i.e. courtesy lights are not activated, and the method ends at block 308. A determination is then made as to the amount of ambient light, as indicated at block 303. If there is sufficient ambient light, then no action is taken, i.e. courtesy lights are not activated, and the method ends at block 308. If it is determined that low ambient light conditions do exist, the method continues at block 304 and the appropriate courtesy lights are activated. Appropriate courtesy lights may include dome lights, entry step lights, area illumination lights, compartment lights or any other illumination light or device to assist in boarding, loading or working on the airborne vehicle.

As the appropriate courtesy lights are activated at block 304, a countdown timer is started, as illustrated at block 305. Block 306 illustrates the step wherein a determination is made if a predetermined time is exceeded as measured by the countdown timer. If the time has not been exceeded, the method continues at block 309 and the timer continues. If the predetermined time has been exceeded, the method continues at block 307 and the previously activated courtesy lights are deactivated. The method then ends at block 308.

Figure 4:
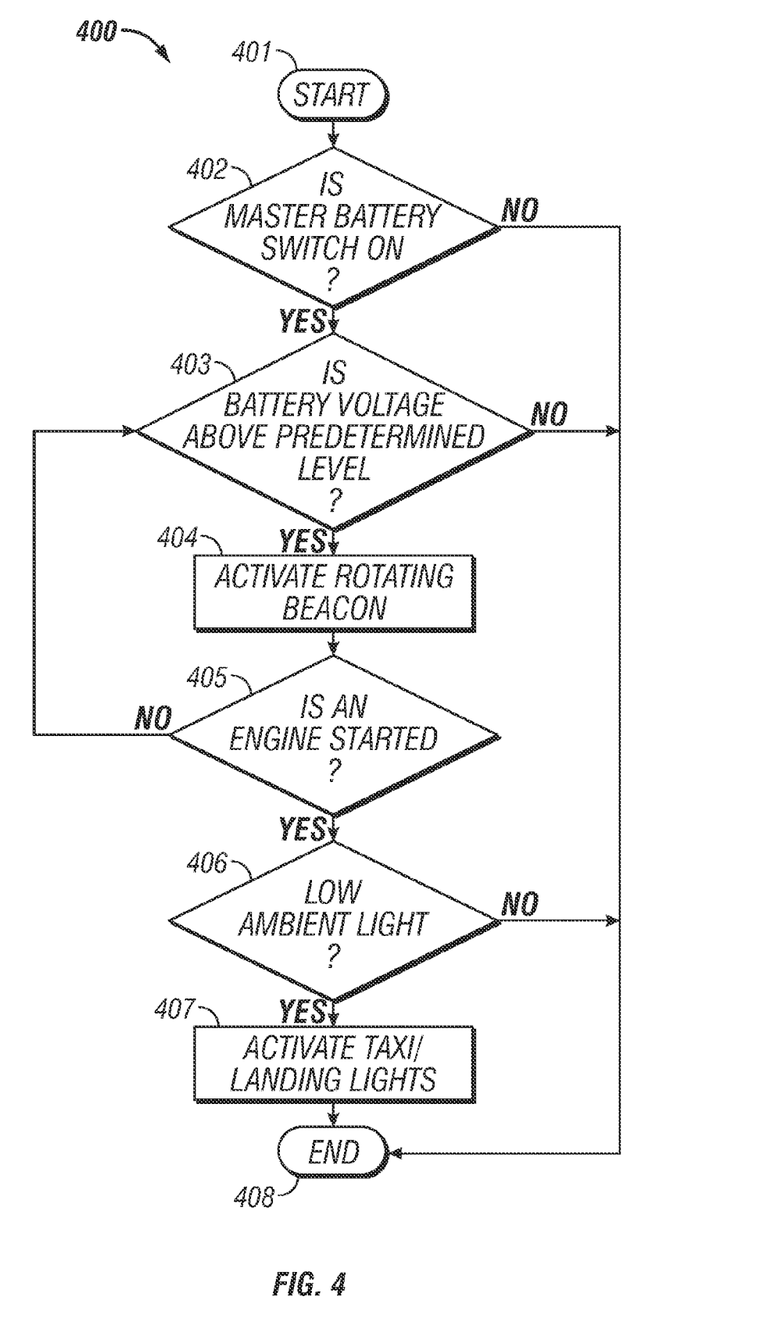
FIG. 4 illustrates a high level flow chart of logical operational steps of a method for automatically controlling airborne vehicle lights during ground operations, in accordance with a preferred embodiment.

FIG. 4 illustrates a high level flow chart of logical operational steps of a method 400 for automatically controlling airborne vehicle lights, specifically during ground operations, in accordance with the disclosed embodiments. The method 400 begins, as illustrated at block 401. A determination can then be made if the vehicle master battery switch is on, as depicted at block 402. If the master battery switch is not on, the method 400 ends, as indicated at block 408. If it is determined, however, that the master battery switch is on, the method 400 continues as described at block 403 wherein the master battery voltage is measured and determined to be at or above a minimum required predetermined voltage for activation of the required lights. If the master battery voltage is not at or above a predetermined voltage, the method 400 ends, as illustrated at block 408, and lights are not activated. If, however, the master battery voltage is at or above the predetermined voltage level, the airborne vehicle rotating beacon is activated, as indicated at block 404.

Block 405 illustrates an operation wherein it is determined if an engine is started. The determination of whether an engine has been started could be through a measurement of engine RPM, EGT, electrical generator output or any other method to ensure the engine has been started. If the engine has not been started, the method returns to process the operation illustrated at block 403, wherein the voltage is monitored to determine if the master battery voltage is above a predetermined voltage. If the engine has been started, the method continues at block 406 wherein the ambient light level is determined. If the ambient light level is above a predetermined level and considered not to be a low light level, i.e. daylight, the method ends at bock 408 without any further light activation. If the ambient light level is determined to be below a predetermined level and in a low light level, i.e. darkness, the method continues at block 407 and the taxi and/or landing lights are activated. The method then ends at block 408.

Figure 5:
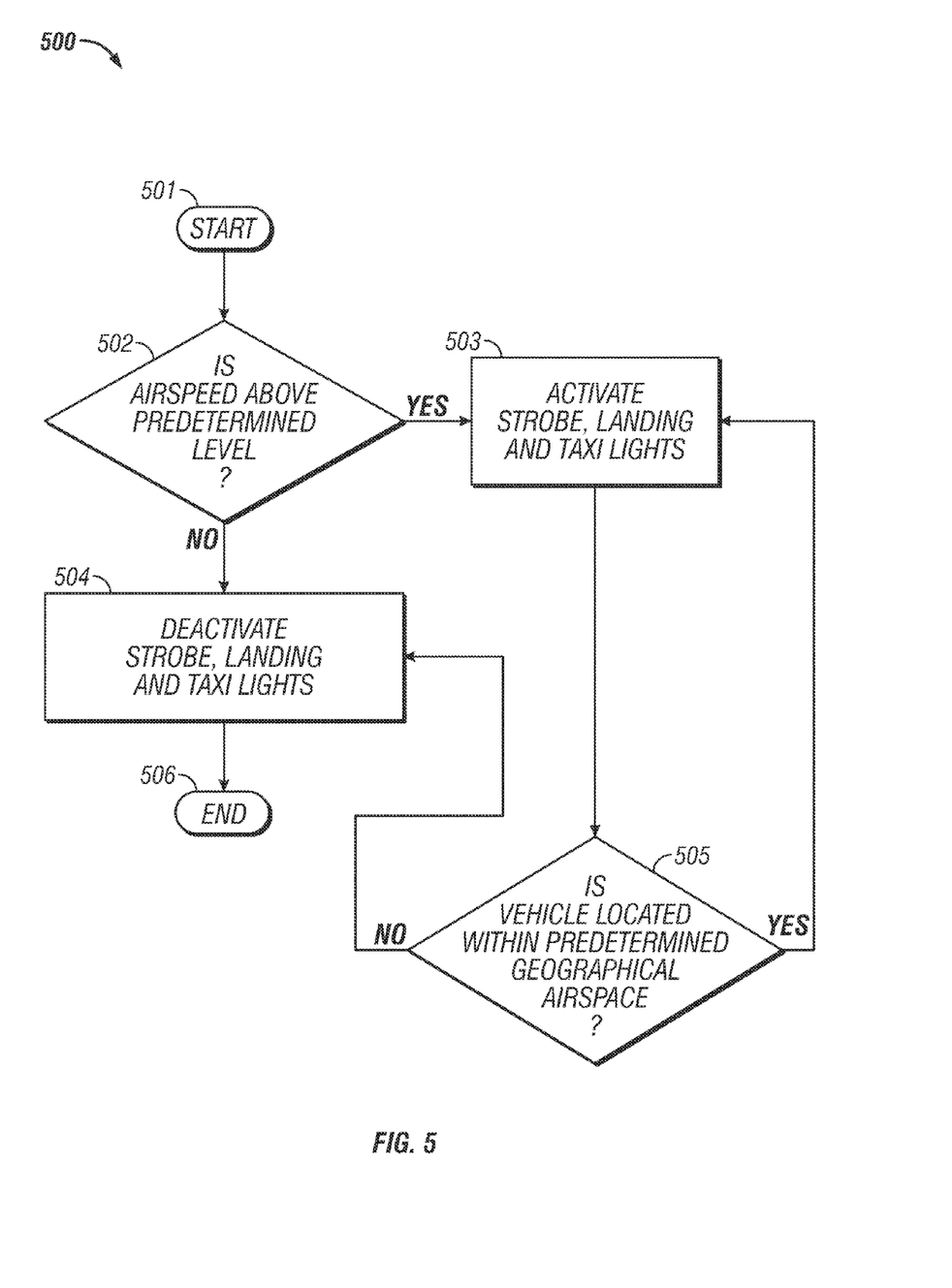
FIG. 5 illustrates a high level flow chart of logical operational steps of a method for automatically controlling airborne vehicle lights during flight operations, in accordance with a preferred embodiment.

FIG. 5 illustrates a high level flow chart of logical operational steps of a method 500 for automatically controlling airborne vehicle lights during flight operations. As indicated at block 501, the method 500 can begin. Next, as illustrated at block 502, an operation can be implemented to determine if the airspeed is above a predetermined level. A non-limiting example can be, for example, vehicle rotate airspeed. If the airspeed is above the predetermined level (i.e. in-flight mode), the strobe, landing or taxi lights can be activated automatically, as depicted at block 503. If the airspeed is below the predetermined airspeed, then as described at block 504, the strobe, landing or taxi lights can be de-activated. In this case, the method 500 can then end, as indicated at block 506.

If, however, the vehicle is in-flight, as determined as depicted at block 502, after the activation of strobe, landing or taxi lights (i.e., see the operation described at block 503) the airborne vehicle position in three-dimensional airspace can be monitored and determined, as described at block at block 505, if the vehicle is located within a predetermined three-dimensional geographical airspace such as an airport traffic area or any other airspace required. If the vehicle is within the predetermined geographical airspace, the method 500 returns to process the operation depicted at block 503 and the lights can be activated or remain activated. If the vehicle is not located within a predetermined geographical airspace, the method 500 continues, as indicated at block 504 wherein the lights are de-activated. The method 500 can finally terminate, as described at block 506.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus for automatically controlling airborne vehicle lighting, comprising:
   a vehicle lighting system for a vehicle;
   a processor positioned upon said vehicle for automatically controlling activation and deactivation of said vehicle lighting system based on an operating mode of said vehicle, wherein said processor communicates with said vehicle lighting system; and
   at least one sensor operatively connected to said processor for sensing said operating mode of said vehicle wherein said operating mode is determined by said processor based on a three-dimensional geographical position of said vehicle.

2. The apparatus of claim 1, further comprising:
   a GPS sensor operatively connected to said processor to determine said three-dimensional geographical position wherein said three-dimensional geographical position includes both an altitude above ground and a geographical position.

3. The apparatus of claim 2, further comprising:
   a database comprising data indicative of a plurality of three-dimensional airspace coordinates, wherein said operating mode of said vehicle is determinate upon said three-dimensional geographical position located within said three-dimensional geographical airspace coordinates.

4. The apparatus of claim 1 wherein said database is stored in a memory that communicates with said processor.

5. The apparatus of claim 1, wherein said at least one sensor comprises a vehicle speed sensor operatively connected to said processor to determine said operating mode.

6. The apparatus of claim 1, wherein said at least one sensor comprises at least one ambient light sensor operatively connected to said processor to determine vehicle lighting system requirements.

7. The apparatus of claim 1, wherein said vehicle comprises an airborne vehicle.

8. The apparatus of claim 7, wherein said operating mode of said airborne vehicle is determinate on a three-dimensional geographical position of said vehicle located within or without a three-dimensional geographical airspace, an altitude above ground of said vehicle, and airspeed of said vehicle.

9. An apparatus for automatically controlling airborne vehicle lighting, comprising:
   a vehicle lighting system for a vehicle;
   a processor positioned upon said vehicle for automatically controlling activation and deactivation of said vehicle lighting system based on an operating mode of said vehicle, wherein said processor communicates with said vehicle lighting system; and
   at least one sensor operatively connected to said processor for sensing said operating mode of said vehicle, wherein said operating mode is determined by said processor based on a three-dimensional geographical position of said vehicle.

10. The apparatus of claim 9, further comprising:
   a GPS sensor operatively connected to said processor to determine said three-dimensional geographical position wherein said three-dimensional geographical position includes both an altitude above ground and a geographical position; and
   a database comprising data indicative of a plurality of three-dimensional airspace coordinates, wherein said operating mode of said vehicle is determinate upon said three-dimensional geographical position located within said three-dimensional geographical airspace coordinates.

11. The apparatus of claim 9, wherein said vehicle comprises an airborne vehicle.

12. An method for automatically controlling airborne vehicle lighting, comprising:
   providing a vehicle lighting system for a vehicle;
   automatically controlling, via a processor positioned upon said vehicle, activation and deactivation of said vehicle lighting system based on an operating mode of said vehicle, wherein said processor communicates with said vehicle lighting system; and
   sensing said operating mode of said vehicle utilizing at least one sensor operatively connected to said processor, wherein said operating mode is based on a three-dimensional geographical position of said vehicle.

13. The method of claim 12, further comprising:
   determining via a GPS sensor, said three-dimensional geographical position, wherein said three-dimensional geographical position includes both an altitude above ground and a geographical position.

14. The method of claim 13, further comprising:
   configuring a database to comprise data indicative of a plurality of three-dimensional airspace coordinates, wherein said operating mode of said vehicle is determinate upon said three-dimensional geographical position located within said three-dimensional geographical airspace coordinates.

15. The method of claim 12, further comprising:
   storing said database in a memory that communicates with said processor.

16. The apparatus of claim 12, further comprising:
   configuring said at least one sensor to comprise a vehicle speed sensor operatively connected to said processor to determine said operating mode.

17. The method of claim 12, further comprising:
   configuring said at least one sensor to comprise at least one ambient light sensor operatively connected to said processor to determine vehicle lighting system requirements.

18. The method of claim 12, wherein said vehicle comprises an airborne vehicle and wherein said operating mode of said airborne vehicle is determinate on said three-dimensional geographical position of said vehicle located within or without a three-dimensional geographical airspace, an altitude above ground of said vehicle, and airspeed of said vehicle.

* * * * *